United States Patent Office 2,802,882
Patented Aug. 13, 1957

2,802,882

PREPARATION OF NOVEL DIALKYLOL DERIVATIVES OF ALKENYLPHENOLS

Alfred R. Bader and Lowell O. Cummings, Milwaukee, Wis., assignors to Pittsburgh Plate Glass Company No Drawing. Application December 4, 1953, Serial No. 396,304

5 Claims. (Cl. 260—621)

This invention relates to a novel class of compounds, namely, the dialkylol alkenylphenols, and to a method for the preparation of such compounds, and pertains more particularly to novel dialkylol butenylphenols and to their preparation by the reaction of butenylphenols with aldehydes.

In a copending application (Serial No. 300,359, filed July 22, 1952, it is disclosed that cyclopentadiene will react with phenolic compounds in the presence of a Friedel-Crafts catalyst to give either mono-, di- or tricyclopentenylphenolic compounds, or mixtures thereof, depending upon the quantity of catalyst utilized and the reaction temperature. Also, in a series of copending applications, Serial Nos. 337,226, 337,227, 337,228 now abandoned, and 337,229, now abandoned, all filed February 16, 1953, it is disclosed that acyclic conjugated dienes react with phenolic compounds in the presence of various Friedel-Crafts type compounds to give monoalkenylphenolic compounds or mixtures of mono-, di- and trialkenylphenolic compounds, the nature of the reaction product depending upon the catalyst strength and the reaction temperature. The unsaturated phenolic compounds prepared according to the methods of the copending applications are very useful in the preparation of heat reactive resins which form excellent films, and are also useful for many other purposes.

It has now been discovered that alkenylphenolic compounds react with aldehydes in the presence of alkaline catalysts and at temperatures below about 130° C. to give a new class of chemical compounds, the dialkylolalkenylphenolic compounds and the salts thereof. These compounds possess the folowing general structure:

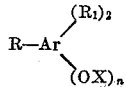

wherein R is alkenyl, cycloalkenyl, haloalkenyl or halocycloalkenyl, Ar is an aromatic radical, $R_1$ is an alkylol radical, preferably containing from 1 to 3 carbon atoms, $n$ is a whole number, preferably 1, but which may be 2 or 3, and X is hydrogen or an inorganic salt forming group. The preferred compounds of the above general class are the dimethylolbutenylphenols and their salts of the structure:

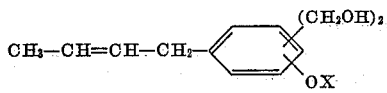

wherein X is hydrogen or an inorganic salt forming group. Compounds of this structure are readily prepared from formaldehyde and butenylphenol, the latter compound being readily and economically obtained by the reaction of butadiene-1, 3 and phenol.

The novel phenols and salts of this invention are prepared by reacting an alkenylphenolic compound with an aldehyde in the presence of an alkaline catalyst. This reaction may be depicted structurally as follows, wherein p-2-butenylphenol and formaldehyde are utilized for illustrative purposes:

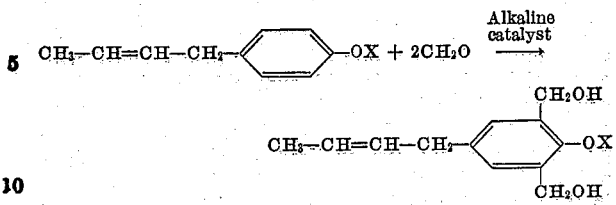

In the equation, X has the significance given above.

In preparing the novel compounds of this invention, alkenylphenolic compounds of the general structure: $R-Ar-(OH)_n$ wherein R, Ar and $n$ have the significance set forth above, are employed. It is obvious that there must be at least two unsubstituted carbon atoms in the aromatic nucleus in order that the alkylol groups may attach thereto during the reaction.

The preferred alkenylphenolic compounds of the structure $R-Ar-(OH)_n$ are those in which R is butenyl and Ar represents a benzene ring, including o- and p-2-butenylphenols. However, other alkenylphenolic compounds may also be used, including butenylcatechols, butenyl-2, 3-dimethoxyphenols, o- and p-cyclopentenylphenols, pentenylphenols, pentenylcresols, halopentenylphenols, hexenylphenols, halohexenylphenols, halohexenylphenols, halohexenylchlorophenols, and the like. All of the above alkenylphenolic compounds, as well as many other compounds possessing the structure set forth hereinabove, are readily prepared by reacting conjugated dienes with phenolic compounds in the presence of a Friedel-Crafts compound or other of the catalysts disclosed in the copending applications referred to hereinabove.

Mixtures of mono-, di- and trialkenylphenolic compounds can also be obtained by the reaction of conjugated dienes with phenolic compounds in the presence of Friedel-Crafts catalysts and such mixtures react with aldehydes to give dialkylolalkenylphenolic compounds or their salts.

Any aldehyde may be utilized in the preparation of the novel compounds of the present invention. However, aldehydes containing only atoms of carbon (from 1 to 3), hydrogen and oxygen, and particularly formaldehyde, are greatly preferred. In place of formaldehyde, a material which decomposes upon heating to yield formaldehyde, for example, paraformaldehyde or trioxymethylene, may be utilized in the reaction. Aqueous formalin, or a solution of formaldehyde in a lower alcohol such as n-butanol, may also be used very successfully.

In carrying out the reaction of alkenylphenols with formaldehyde an akaline catalyst is employed. Both inorganic and organic materials, including sodium hydroxide, ammonium hydroxide, potassium hydroxide, calcium hydroxide, barium hydroxide, sodium carbonate, potassium carbonate, hexamethylenetetramine, and the like may be used. Mixtures of two or more alkaline materials may be utilized.

The quantity of catalyst employed is generally about 5.0 percent to about 25.0 percent based upon the weight of the alkenylphenol utilized, although larger or smaller amounts may be employed if desired.

It will be noted from the foregoing reaction equation that two moles of the aldehyde for each mole of the alkenylphenolic compound are required stoichiometrically for the reaction to proceed. However, greater excesses of the aldehyde may be utilized, although no apparent advantage is obtained by the use of an excess, and in fact, for obvious reasons of economy, the reactants are preferably brought together in approximately the stoichiometric 2 to 1 ratio.

The reaction of alkenylphenolic compounds with formaldehyde to produce dialkylolalkenylphenolic compounds in accordance with this invention proceeds quite readily whenever the reactants and catalyst are brought into efficient contact with one another. In a preferred procedure, the alkenylphenol, an aqueous solution of the catalyst, and formaldehyde in the form of an aqueous solution are admixed at room temperature. The reaction is usually somewhat exothermic and is allowed to proceed without external heating or cooling for approximately 48 to 72 hours. The reaction mixture is then acidified with a material such as acetic acid, hydrochloric acid, sulfuric acid, or the like, triturated with an aromatic hydrocarbon such as toluene, and the crystalline dialkylolalkenylphenolic compound recrystallized from a solvent such as methanol or ethanol. The dialkylol derivative is obtained in the form of crystals of extremely high purity. Many modifications of the above procedure can be employed with good results.

The temperature at which the reaction is carried out should be maintained below about 130° C. If higher temperatures are utilized, condensation of the aldehyde with the alkenylphenolic compound is likely to take place to form resinous products rather than crystalline dialkylol derivatives. The alkaline condensation of aldehydes with alkenylphenolic compounds is described in copending application, Serial No. 390,089, filed November 3, 1953.

action mixture was then triturated with 10 grams of 30 percent acetic acid and the oil which separated and crystallized on cooling was recrystallized from aqueous methanol to yield shiny, white platelets melting at 77° C. to 78° C. The product was identified as dimethylolbutenylphenol.

*Analysis*

| Calculated | | Found | |
|---|---|---|---|
| C | H | C | H |
| 69.20 | 7.93 | 68.84 | 7.57 |

EXAMPLES II AND III

Cyclopentenylphenol and pentenylphenol were each reacted with formaldehyde in accordance with Example I utilizing in each reaction two moles of formaldehyde to one mole of the alkenylphenol and ¼ mole of sodium hydroxide. The structure of the compounds prepared, the solvent of crystallization, melting point and analysis of the compounds obtained are set forth in the following table:

| Example | Structure | Solvent of Crystallization | Melting Point, °C. | Analysis | | | |
|---|---|---|---|---|---|---|---|
| | | | | Calculated | | Found | |
| | | | | C | H | C | H |
| II | HOCH₂–[phenol ring with OH, CH₂OH, and cyclopentenyl substituent] | Toluene-ethanol | 106 | 70.89 | 7.32 | 71.18 | 7.56 |
| III | HOCH₂–[phenol ring with OH, CH₂OH, and CH₂–CH=CH–(CH₃)(CH₃) substituent] | Aqueous methanol | 110–111 | 70.24 | 8.16 | 70.44 | 8.27 |

In order that highest yields of the dialkylol derivatives be obtained, it is preferred that the reactants and catalysts be brought together at about room temperature (25° C.). However, lower temperatures, for example as low as —20° C. may be employed, although longer periods of time will be required to obtain substantial yields of the desired product.

The following examples illustrate more fully the preparation of novel dialkylolalkenylphenolic compounds in accordance with the present invention. The examples are not intended to limit the invention, however, for there are, of course, numerous possible variations and modifications.

EXAMPLE I

Fifteen grams of para-2-butenylphenol was dissolved in a solution of 1 gram of sodium hydroxide and 10 cc. of water. Twelve grams of a 37 percent formalin solution was then added to the butenylphenol-catalyst mixture, and the colorless syrup was allowed to stand at room temperature for approximately 48 hours. The re-

EXAMPLE IV

One mole of a mixture of mono-, di- and tributenylphenols (obtained by the reaction of butadiene-1,3 with phenol in the presence of sulfuric acid), ¼ mole of sodium hydroxide and 2 moles of formaldehyde were admixed in aqueous solution and allowed to stand for about 48 hours at 25° C. At the end of this period a yellow oil had formed from which dialkylol monobutenylphenol could be recovered by a fractional crystallization process or by distillation.

When the above examples were repeated utilizing other quantities of reactants and/or catalysts, or when the reaction is carried out at other temperatures within the range of about —20° C. to 130° C. good results are obtained. Similarly, when other alkenylphenols selected from those disclosed hereinabove or other aldehydes are substituted for the alkenylphenols and formaldehyde of the above examples, dialkylolalkenylphenols are again obtained in good yield and in a pure crystalline form. Thus, for example, diethylolbutenylphenol is obtained by the alkaline catalyzed reaction of butenylphenol with acetaldehyde; dipropylolbutenylphenol is obtained by the alkaline catalyzed reaction of butenylphenol with propionaldehyde; and dimethylolbutenylresorcinol is obtained by the alkaline catalyzed reaction of butenylresorcinol with formaldehyde.

The novel dialkylolalkenylphenolic compounds obtained by the process of this invention are very useful for many purposes. For example, they may be spread on a metallic surface such as tin plate and baked to give excellent films. To illustrate, the dimethylolbutenylphenol obtained in accordance with Example I hereinabove was applied to tin plate and baked at 350° F. for 15 minutes, whereupon a clear, hard, light yellow film was obtained. In the form of such films, the dialkylolalkenylphenolic compounds may be useful as sanitary liners for food containers and the like. The dialkylolalkenylphenolic compounds may also be reacted with unsaturated chlorohydrocarbons such as allyl chloride to form unsaturated monomeric materials. This reaction is illustrated by the following equation.

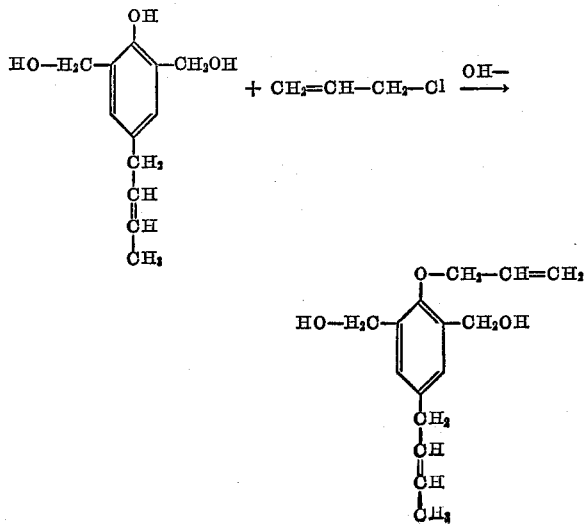

The unsaturated monomers obtained are also heat reactive and cure readily to give useful films.

From the foregoing description it will be seen that the alkylolalkenylphenolic compounds and salts thereof constitute a very valuable class of compounds which has not been prepared heretofore. It is apparent, therefore, that various embodiments of the invention, in addition to those specifically disclosed, may be provided without departing from the spirit and scope of the invention as defined in the appended claims.

We claim:
1. A dimethylol cyclopentenylphenol.
2. A dimethylol-2-cyclopentenylphenol.
3. Dimethylol-p-2-cyclopentenylphenol.
4. The method which comprises reacting a cyclopentenylphenol with formaldehyde in the presence of an alkaline catalyst at a temperature below about 130° C., and acidifying the reaction mixture, thereby to obtain a dimethylol cyclopentenylphenol.
5. The method which comprises reacting p-2-cyclopentenylphenol with formaldehyde in the presence of an alkaline catalyst at a temperature below about 130° C., and acidifying the reaction mixture, thereby to obtain dimethylol-2-cyclopentenylphenol.

References Cited in the file of this patent
UNITED STATES PATENTS

| | | |
|---|---|---|
| 2,268,946 | Krumbhaar | Jan. 6, 1942 |
| 2,283,465 | Schaad | May 19, 1942 |
| 2,707,715 | Martin | May 3, 1955 |

FOREIGN PATENTS

| | | |
|---|---|---|
| 558,987 | Great Britain | Jan. 31, 1944 |

OTHER REFERENCES

Martin: Jour. Amer. Chem. Soc., vol. 73 (1951), pp. 3952–4 (3 pages.).